United States Patent
Lambka et al.

(10) Patent No.: US 8,129,874 B2
(45) Date of Patent: Mar. 6, 2012

(54) INTERNAL OIL COOLING VIA HOUSING END BRACKETS FOR AN ELECTRIC MACHINE

(76) Inventors: Carolyn Lambka, Dubuque, IA (US); Eric Richard Anderson, Galena, IL (US)

(*) Notice: Subject to any disclaimer, the term of this patent is extended or adjusted under 35 U.S.C. 154(b) by 230 days.

(21) Appl. No.: 12/486,263

(22) Filed: Jun. 17, 2009

(65) Prior Publication Data

US 2010/0320851 A1 Dec. 23, 2010

(51) Int. Cl.
*H02K 9/00* (2006.01)
*H02K 9/26* (2006.01)

(52) U.S. Cl. ............ 310/54; 310/53; 310/56; 310/58; 310/60 A

(58) Field of Classification Search .............. 310/53, 310/54, 56, 57, 58, 60 A; 62/64
See application file for complete search history.

(56) References Cited

U.S. PATENT DOCUMENTS

| 2,947,213 | A | * | 8/1960 | Oddie | 356/391 |
| 3,648,085 | A | | 3/1972 | Fujii | |
| 5,003,207 | A | | 3/1991 | Krinickas et al. | |
| 2003/0164651 | A1 | * | 9/2003 | Tornquist et al. | 310/61 |
| 2005/0151431 | A1 | * | 7/2005 | Cronin et al. | 310/60 A |
| 2006/0010873 | A1 | * | 1/2006 | Henriquez | 60/752 |

FOREIGN PATENT DOCUMENTS

JP 2006006047 A * 1/2006
JP 2006311750 A * 11/2006

OTHER PUBLICATIONS

Machine Translation JP20060164651 (2006) and JP2006006047 (2006).*

* cited by examiner

*Primary Examiner* — Quyen Leung
*Assistant Examiner* — Jose Gonzalez Quinones
(74) *Attorney, Agent, or Firm* — Faegre Baker Daniels

(57) ABSTRACT

A system for cooling an electrical machine is disclosed. The electrical machine includes a stator including a plurality of coils, an exterior housing, and an end cap. During operation of the electrical machine, a fluid is sprayed from the end cap onto the plurality of coils to carry away heat generated by the electrical machine.

18 Claims, 10 Drawing Sheets

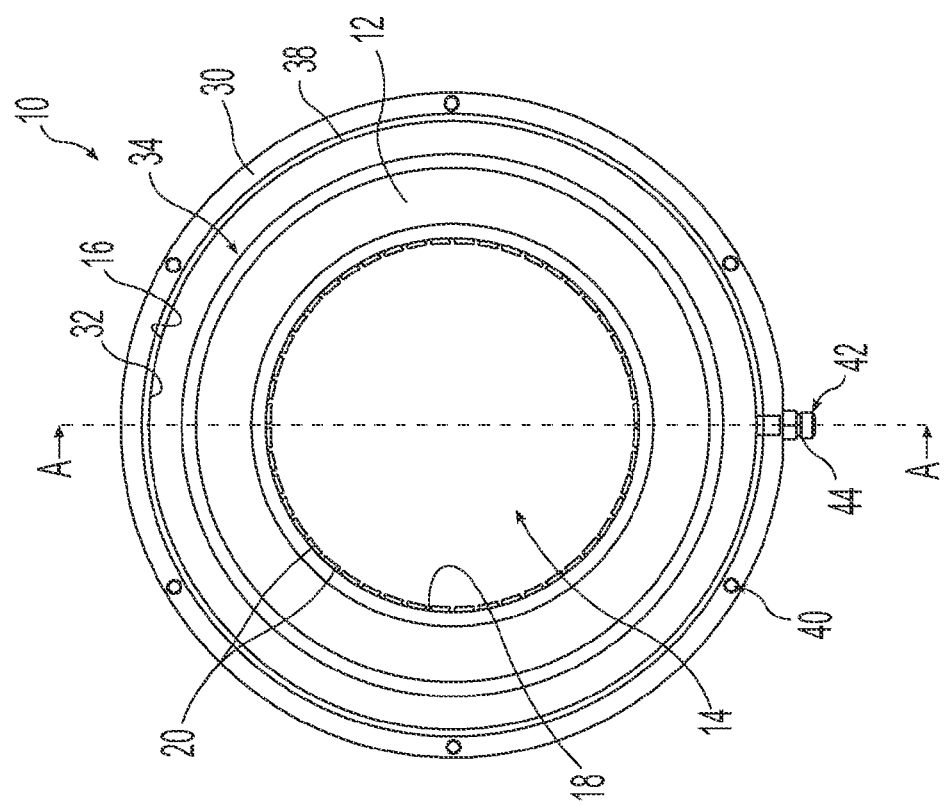
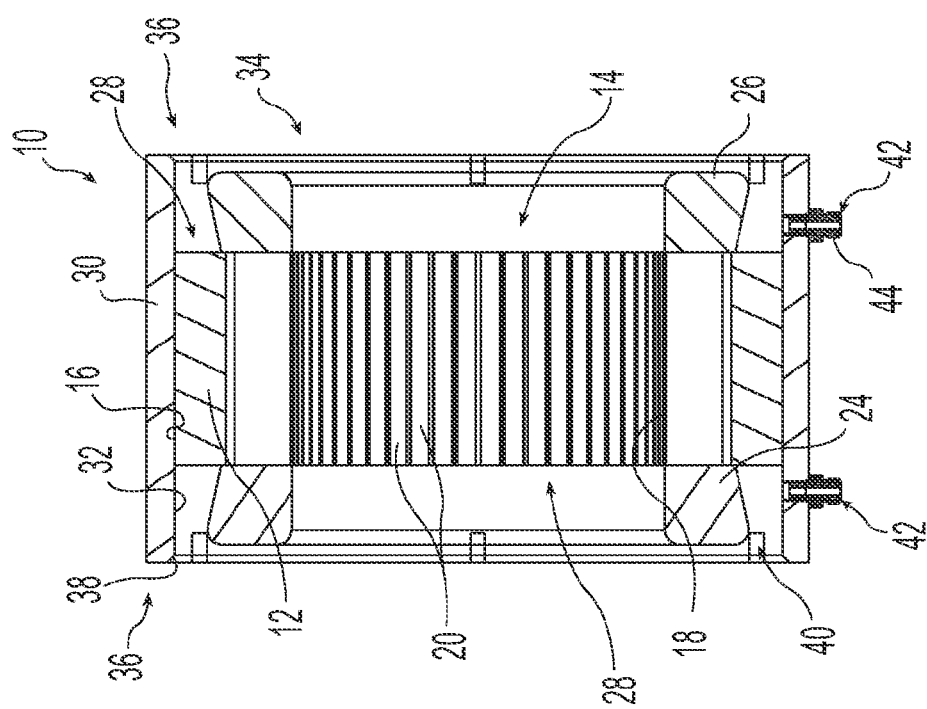

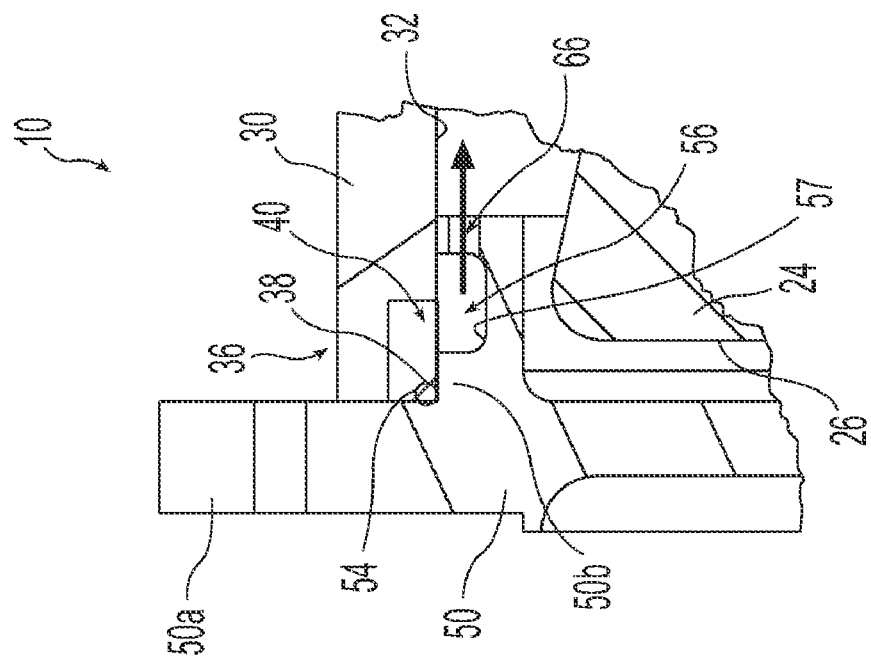
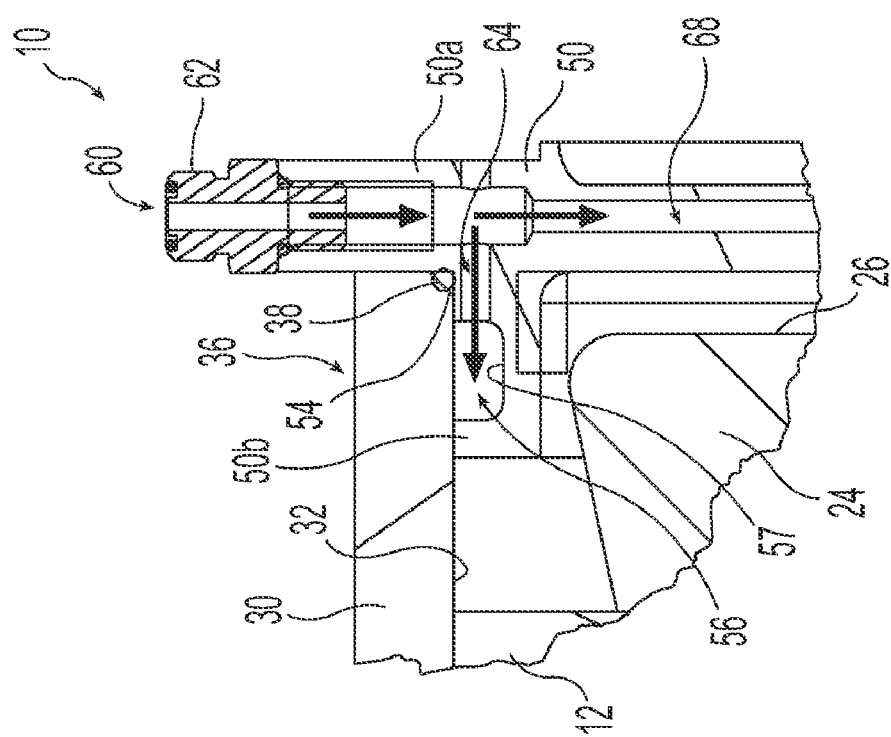
Fig. 2C
Fig. 2D

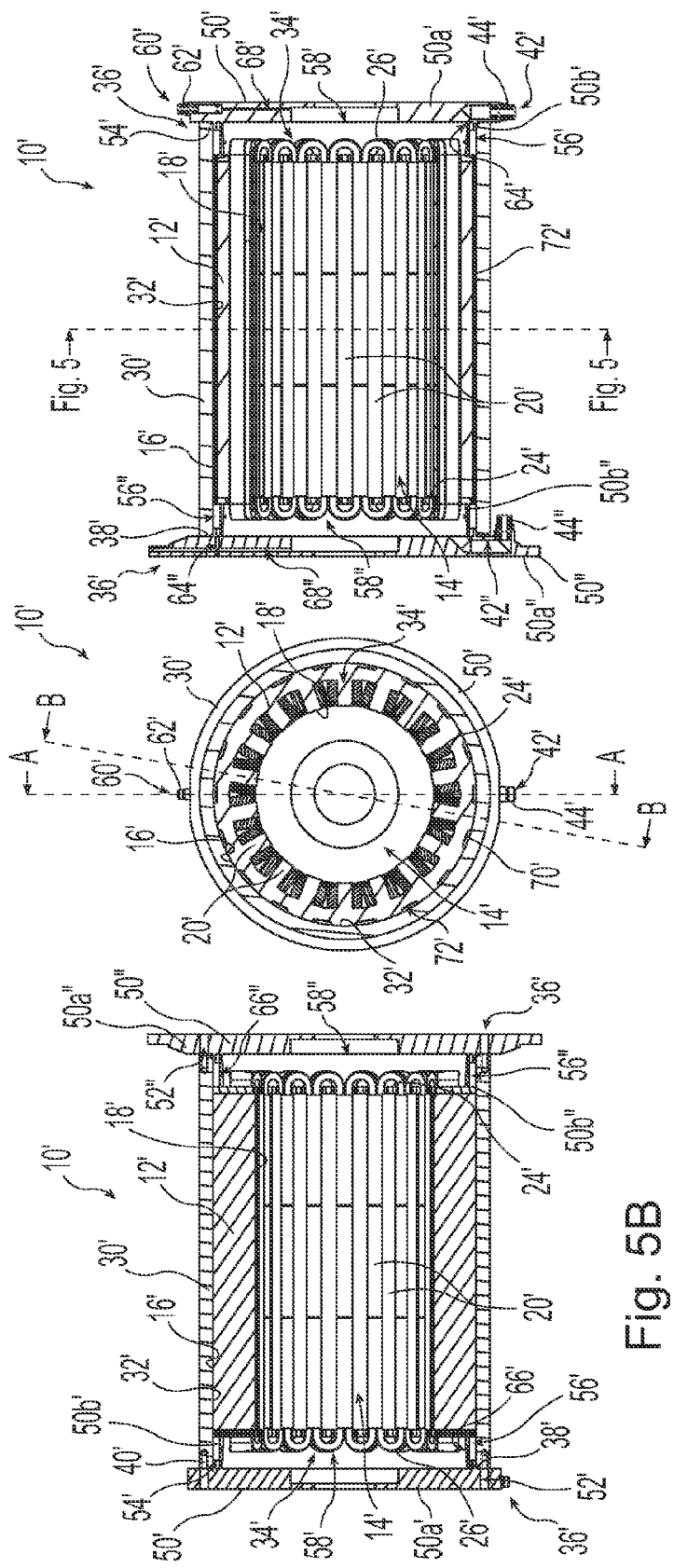

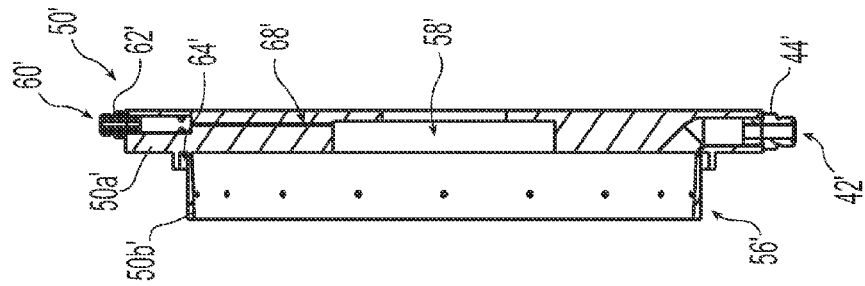
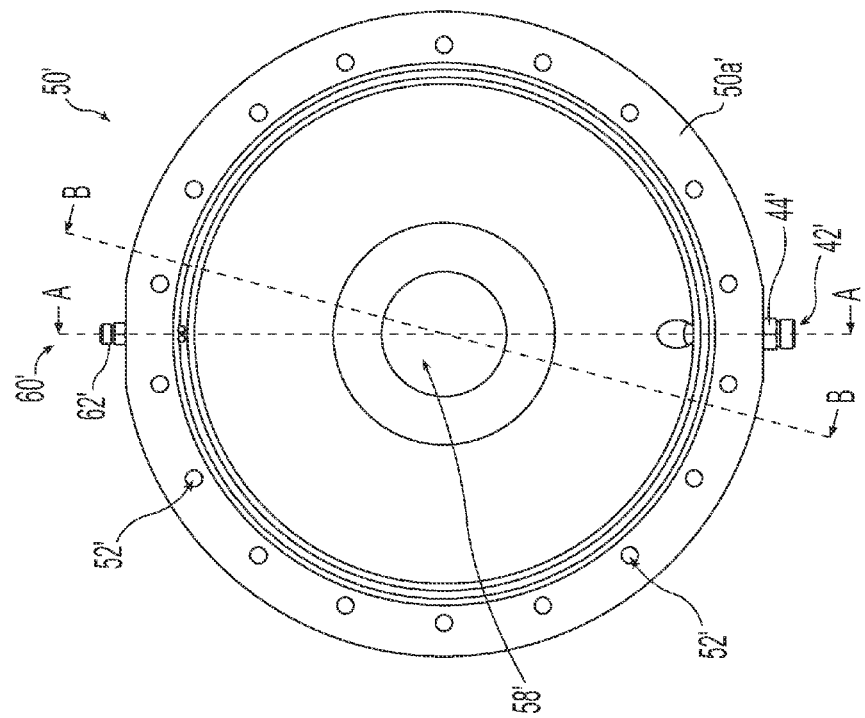
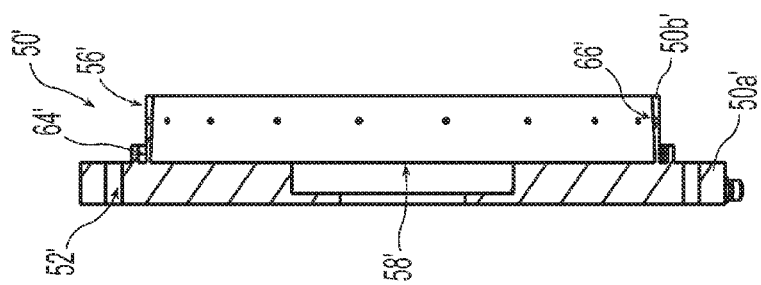

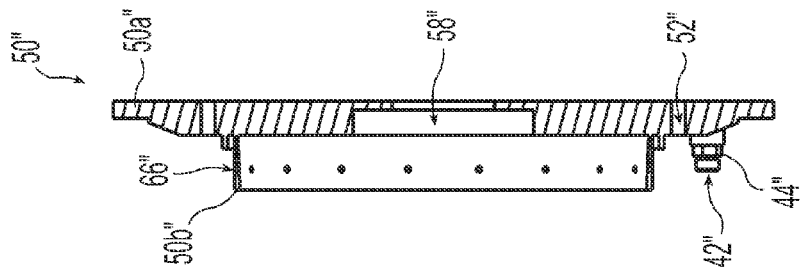
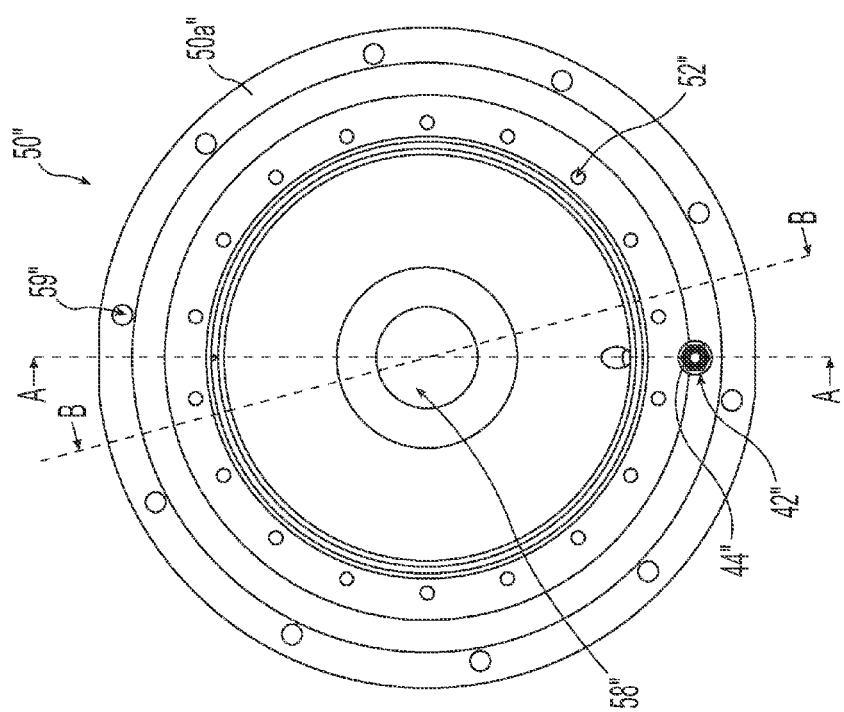
Fig. 7
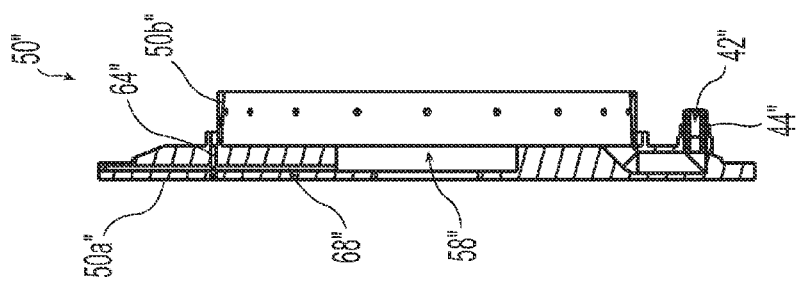

INTERNAL OIL COOLING VIA HOUSING END BRACKETS FOR AN ELECTRIC MACHINE

FIELD OF THE INVENTION

The present disclosure relates to a system for cooling an electrical machine. More particularly, the present disclosure relates to an internal oil cooling system for an electrical machine.

BACKGROUND OF THE INVENTION

Electrical machines, including motors and generators, generate heat during operation. To cool the electrical machine, air or liquid coolant may be directed through an exterior housing that surrounds the electrical machine, for example. During operation of the electrical machine, air or liquid coolant flows through the exterior housing, absorbing and carrying away heat from the electrical machine. As another example, the electrical machine may be submerged in a liquid coolant during operation.

SUMMARY

The present disclosure provides an internal oil cooling system for an electrical machine. The electrical machine includes a stator including a plurality of coils, an exterior housing, and an end cap. During operation of the electrical machine, a fluid is sprayed from the end cap onto the plurality of coils to carry away heat generated by the electrical machine.

According to an embodiment of the present disclosure, an electrical machine is provided including a stator, an exterior housing, and an end cap. The stator includes a plurality of coils, the stator defining an axial bore configured to receive a rotor. The exterior housing has a first axial end and a second axial end, the exterior housing defining an axial chamber configured to receive the stator. The end cap is configured to couple to at least one of the first and second axial ends of the exterior housing. The end cap includes a fluid inlet configured to receive a fluid and a plurality of fluid outlets, at least one of the plurality of fluid outlets configured to deliver the fluid from the fluid inlet to at least one of the plurality of coils.

According to another embodiment of the present disclosure, an electrical machine is provided including a stator, an exterior housing, and an end cap. The stator includes a plurality of coils, the stator defining an axial bore configured to receive a rotor. The exterior housing has a first axial end and a second axial end, the exterior housing defining an axial chamber configured to receive the stator. The end cap is configured to couple to at least one of the first and second axial ends of the exterior housing. The electrical machine also includes a fluid inlet configured to receive a fluid and a plurality of fluid outlets defined by the end cap and configured to deliver the fluid from the fluid inlet to the plurality of coils.

According to yet another embodiment of the present disclosure, a method is provided for cooling an electrical machine. The electrical machine includes a stator having a plurality of coils, an exterior housing that surrounds the stator and has a first axial end and a second axial end, and an end cap coupled to at least one of the first and second axial ends of the exterior housing. The method includes the steps of delivering a liquid coolant to the end cap of the electrical machine and spraying the liquid coolant from the end cap onto the plurality of coils of the stator.

BRIEF DESCRIPTION OF THE DRAWINGS

The above-mentioned and other features and advantages of this disclosure, and the manner of attaining them, will become more apparent and the disclosure itself will be better understood by reference to the following description taken in conjunction with the accompanying drawings, wherein:

FIG. 1 is a top plan view of an exemplary electrical machine of the present disclosure including an exterior housing and a stator;

FIG. 1A is a cross-sectional view of the electrical machine of FIG. 1, taken along line A-A of FIG. 1;

FIG. 2C is a detailed view of a portion of the electrical machine of FIG. 2A;

FIG. 2D is a detailed view of a portion of the electrical machine of FIG. 2B;

FIG. 5 is a cross-sectional view of the electrical machine of FIG. 4, further including a first and second end caps coupled to the exterior housing;

FIG. 5A is a cross-sectional view of the electrical machine of FIG. 5, taken along line A-A of FIG. 5;

FIG. 5B is a cross-sectional view of the electrical machine of FIG. 5, taken along line B-B of FIG. 5;

FIG. 6 is a top plan view of the first end cap of FIG. 5A;

FIG. 6A is a cross-sectional view of the first end cap of FIG. 6, taken along line A-A of FIG. 6;

FIG. 6B is a cross-sectional view of the first end cap of FIG. 6, taken along line B-B of FIG. 6;

FIG. 7 is a top plan view of the second end cap of FIG. 5A;

FIG. 7A is a cross-sectional view of the second end cap of FIG. 7, taken along line A-A of FIG. 7;

FIG. 7B is a cross-sectional view of the second end cap of FIG. 7, taken along line B-B of FIG. 7;

Corresponding reference characters indicate corresponding parts throughout the several views. The exemplifications set out herein illustrate exemplary embodiments of the disclosure and such exemplifications are not to be construed as limiting the scope of the invention in any manner.

DETAILED DESCRIPTION

Figure 2A:
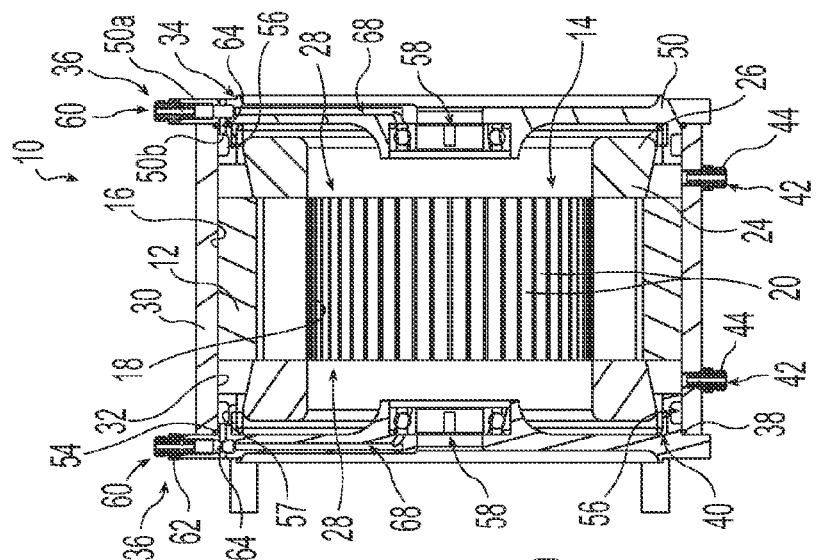
FIG. 2A is a cross-sectional view of the electrical machine of FIG. 2, taken along line A-A of FIG. 2.
Figure 2:
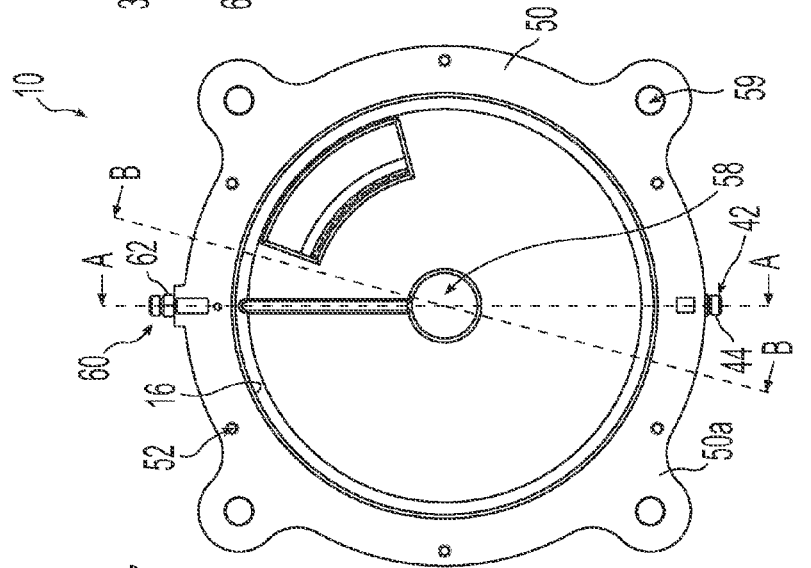
FIG. 2 is a top plan view of the electrical machine of FIG. 1, further including end caps coupled to the exterior housing.

FIGS. 1-2 illustrate an exemplary electrical machine in the form of motor 10. Although the electrical machine is illustrated and described herein as motor 10, machines of the present disclosure may also include generators, for example. Motor 10 includes stator 12. Stator 12 is substantially cylindrical and defines axial bore 14 configured to receive a rotor (not shown). In operation, power is supplied to motor 10 to rotate the rotor relative to the surrounding stator 12.

Stator 12 includes outer periphery 16 and inner periphery 18. Inner periphery 18 of stator 12 surrounds axial bore 14 and also includes a plurality of radially-spaced winding teeth 20. Wires, such as insulated copper wires, wrap repeatedly around each winding tooth 20 of stator 12 to form coils 24. End turns 26 of coils 24 are formed as the wires reverse direction at both axial ends 28 of stator 12 to wrap the wires repeatedly around each winding tooth 20.

Referring to FIGS. 1 and 1A, motor 10 also includes exterior housing 30. Exterior housing 30 is substantially cylindrical and includes inner wall 32 that defines axial bore 34. Exterior housing 30 also includes axial ends 36. Exterior housing 30 may be constructed of a steel tube, for example. To assemble motor 10, exterior housing 30 may be prepared to receive stator 12. More particularly, exterior housing 30 may be cut to length to receive stator 12 between axial ends 36 of exterior housing 30, and inner wall 32 of exterior housing 30 may be sized and shaped to receive stator 12 in axial bore 34 of exterior housing 30. For example, as shown in FIGS. 1 and 1A, inner wall 32 of exterior housing 30 may be sized and shaped to contact and frictionally engage outer periphery 16 of stator 12. As discussed in more detail below, inner wall 32 of exterior housing 30 may include chamfer 38 at both axial ends 36. Also, both axial ends 36 of exterior housing 30 may include attachment apertures 40 formed by tapping or drilling holes axially into axial ends 36 of exterior housing 30, for example.

Exterior housing 30 of motor 10 also includes at least one drain port 42 that extends radially through exterior housing 30. As shown in FIG. 1A, motor 10 includes two drain ports 42. Drain ports 42 may be formed by tapping or drilling holes radially into exterior housing 30, for example. According to an exemplary embodiment of the present disclosure, each drain port 42 is located near axial end 36 of exterior housing 30 to be positioned axially beyond the corresponding axial end 28 of stator 12. Each drain port 42 may be configured to receive hydraulic fitting 44 for draining fluid from motor 10. It is within the scope of the present disclosure that inner wall 32 of exterior housing 30 may be tapered to direct fluid toward drain port 42.

Referring to FIGS. 2-2D, motor 10 further includes at least one substantially circular end plate or cap 50. Each end cap 50 may be constructed of steel or cast iron, for example. In the illustrated embodiment, motor 10 includes two substantially identical end caps 50, each end cap 50 coupled to a corresponding axial end 36 of exterior housing 30. Each end cap 50 may include a first, cap portion 50a that rests against axial end 36 of exterior housing 30 and a second, cylindrical portion 50b that extends within axial bore 34 of exterior housing 30. To secure end caps 50 to exterior housing 30, cap portion 50a of each end cap 50 may include attachment apertures 52 that align with attachment apertures 40 in exterior housing 30 for receiving a suitable fastener (not shown), such as a screw or a bolt. Seal 54, such as an elastomeric O-ring, may be positioned between exterior housing 30 and each end cap 50 to seal the components. According to an exemplary embodiment of the present disclosure, seal 54 may be retained between cylindrical portion 50b of each end cap 50 and chamfer 38 in inner wall 32 of exterior housing 30.

With end cap 50 secured to exterior housing 30, motor 10 includes an internal, annular channel 56 that extends substantially about the circumference of motor 10. In the illustrated embodiment of FIGS. 2C and 2D, cylindrical portion 50b of end cap 50 includes circumferential notch 57 that cooperates with inner wall 32 of exterior housing 30 to define annular channel 56. It is also within the scope of the present disclosure that stator 12 may cooperate with end cap 50 and exterior housing 30 to define annular channel 56. Forming part of annular channel 56 with end cap 50 and the rest of annular channel 56 with exterior housing 30 and/or stator 12, rather than forming annular channel 56 entirely within end cap 50, simplifies the construction of end cap 50. For example, in the illustrated embodiment of FIGS. 2C and 2D, end cap 50 may be constructed to include circumferential notch 57 rather than a hollow chamber that extends entirely within end cap 50.

As shown in FIG. 2, each end cap 50 may include central bore 58. When motor 10 is fully assembled, a bearing or shaft of the rotor (not shown) may extend through central bore 58 of each end cap 50. End cap 50 may support the rotor shaft in central bore 58 during operation of motor 10.

To secure motor 10 to another mechanical device, such as the mechanical device powered by motor 10, each end cap 50 may also include mounting apertures 59. Like attachment apertures 52 of end cap 50, mounting apertures 59 of end cap 50 may be configured to receive a fastener (not shown), such as a screw or a bolt. In this embodiment, end caps 50 may serve as mounting brackets for mounting motor 10 to another mechanical device.

Figure 3A:
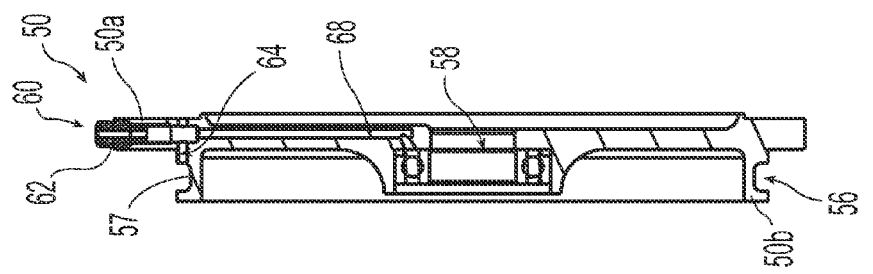
FIG. 3A is a cross-sectional view of the end cap of FIG. 3, taken along line A-A of FIG. 3.
Figure 3:
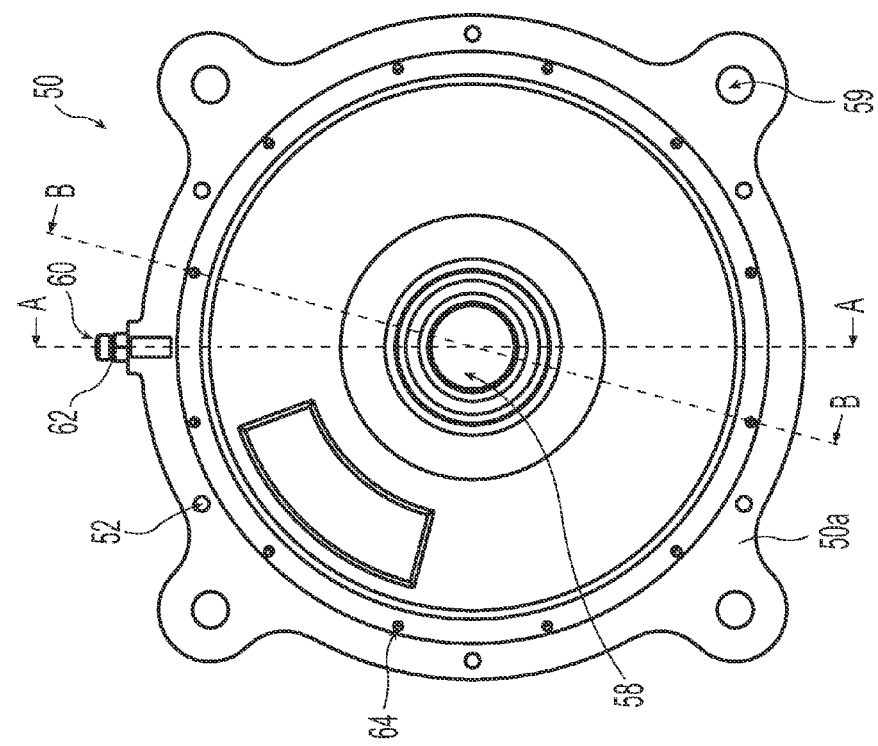
FIG. 3 is a top plan view of one of the end caps of FIG. 2.
Figure 3B:
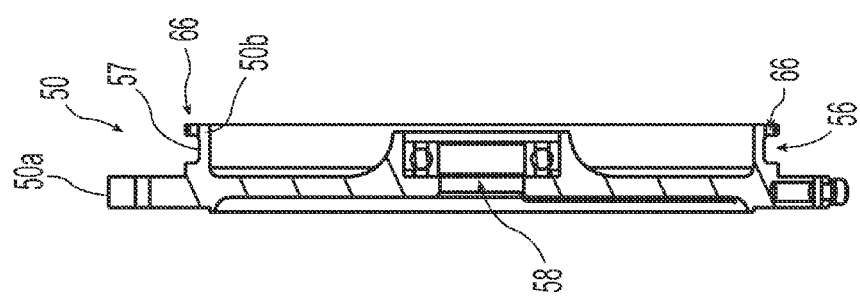
FIG. 3B is a cross-sectional view of the end cap of FIG. 3, taken along line B-B of FIG. 3.

An exemplary end cap 50 is shown in more detail in FIGS. 3, 3A, and 3B. End cap 50 of motor 10 includes at least one entry port 60 that extends radially into end cap 50. Entry port 60 may be formed by tapping or drilling holes radially into cap portion 50a of end cap 50, for example. Entry port 60 of end cap 50 may be configured to receive hydraulic fitting 62 for injecting fluid into motor 10.

As shown in FIG. 3A, end cap 50 includes entry channel 64 that extends between entry port 60 of end cap 50 and annular channel 56 of motor 10 which is partially defined by notch 57 of end cap 50. Entry channel 64 may be formed by tapping or drilling holes axially into end cap 50, and in particular, into cap portion 50a of end cap 50. In operation, fluid injected into entry port 60 may be directed into annular channel 56 of motor 10 via entry channel 64.

Figure 2B:
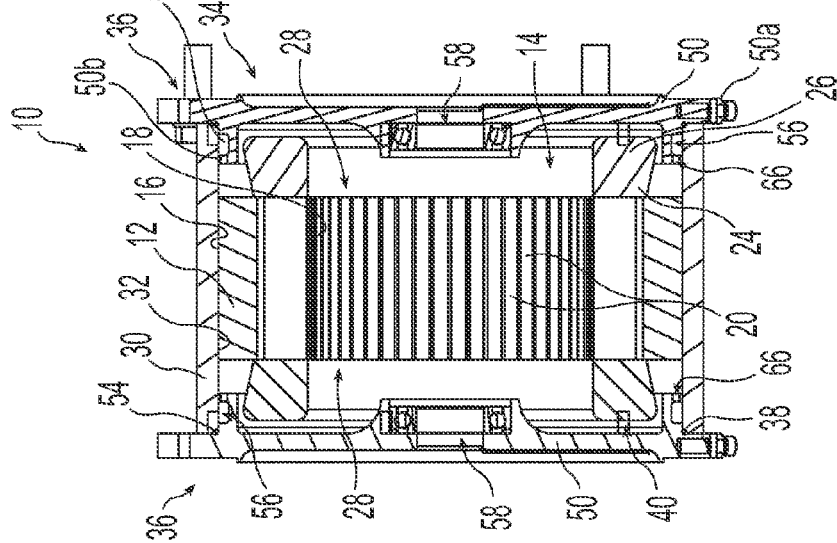
FIG. 2B is a cross-sectional view of the electrical machine of FIG. 2, taken along line B-B of FIG. 2.

As shown in FIG. 3B, end cap 50 also includes a plurality of discharge channels 66. Discharge channels 66 extend from annular channel 56 of motor 10 which is partially defined by notch 57 of end cap 50. Discharge channels 66 may be formed by tapping or drilling holes into end cap 50, and in particular, into cylindrical portion 50b of end cap 50. In operation, fluid injected into entry port 60 may be directed into annular channel 56 of motor 10 via entry channel 64, and fluid in annular channel 56 of motor 10 may be directed toward coils 24 of stator 12 via discharge channels 66. According to an exemplary embodiment of the present disclosure, discharge channels 66 are spaced radially about end cap 50. Each discharge channel 66 may align with a corresponding end turn 26 of coils 24 to direct fluid onto that end turn 26. As shown by comparing FIGS. 3A and 3B, discharge channels 66 may be aligned substantially parallel to entry channel 64. However, it is also within the scope of the present disclosure that discharge channels 66 may extend radially inward from annular channel 56 toward coils 24 of stator 12 (FIGS. 2A and 2B). For example, discharge channels 66 may extend at an angle through cylindrical portion 50b of end cap 50.

Referring again to FIG. 3A, end cap 50 may also include a bearing channel 68 that extends between entry port 60 and central bore 58 of end cap 50. Bearing channel 68 may be formed by tapping or drilling holes radially inwardly into end cap 50. In operation, fluid injected into entry port 60 may be directed either toward central bore 58 via bearing channel 68 or into annular channel 56 of motor 10 via entry channel 64.

Referring back to FIGS. 2C and 2D, during operation of motor 10, a liquid coolant, such as oil, is delivered to motor 10 for cooling. As shown in FIG. 2C, the oil may be directed through an external hydraulic hose or tube (not shown), for example, and into entry port 60 of one or both end caps 50. If end cap 50 includes bearing channel 68, some of the oil that enters entry port 60 may flow toward central bore 58 (FIG. 2A) of end cap 50 via bearing channel 68 to lubricate the rotor shaft (not shown). The rest of the oil that enters entry port 60 flows into annular channel 56 of motor 10 via entry channel 64, such that the oil substantially surrounds stator 12. Next, as shown in FIG. 2D, the oil sprays onto coils 24 of stator 12 from annular channel 56 via discharge channels 66 that are spaced radially about stator 12. For example, the oil may spray onto end turns 26 of coils 24 via discharge channels 66. Upon contacting coils 24, the oil absorbs and carries away heat from coils 24. As a result, the cooled coils 24 draw heat away from the center of motor 10 toward end caps 50. As shown in FIG. 2A, the heated oil then exits motor 10 through drain ports 42 of exterior housing 30. It is also within the scope of the present disclosure that the heated oil may exit from end caps 50 of motor 10 rather than from exterior housing 30 of motor 10. Drain ports 42 may be positioned along the bottom of motor 10 such that the heated oil exits motor 10 under the force of gravity. The oil may be directed from drain ports 42 through external hydraulic hoses or tubes (not shown), for example. The oil that exits motor 10 may be cooled and recycled through motor 10 for further cooling.

Figure 8:
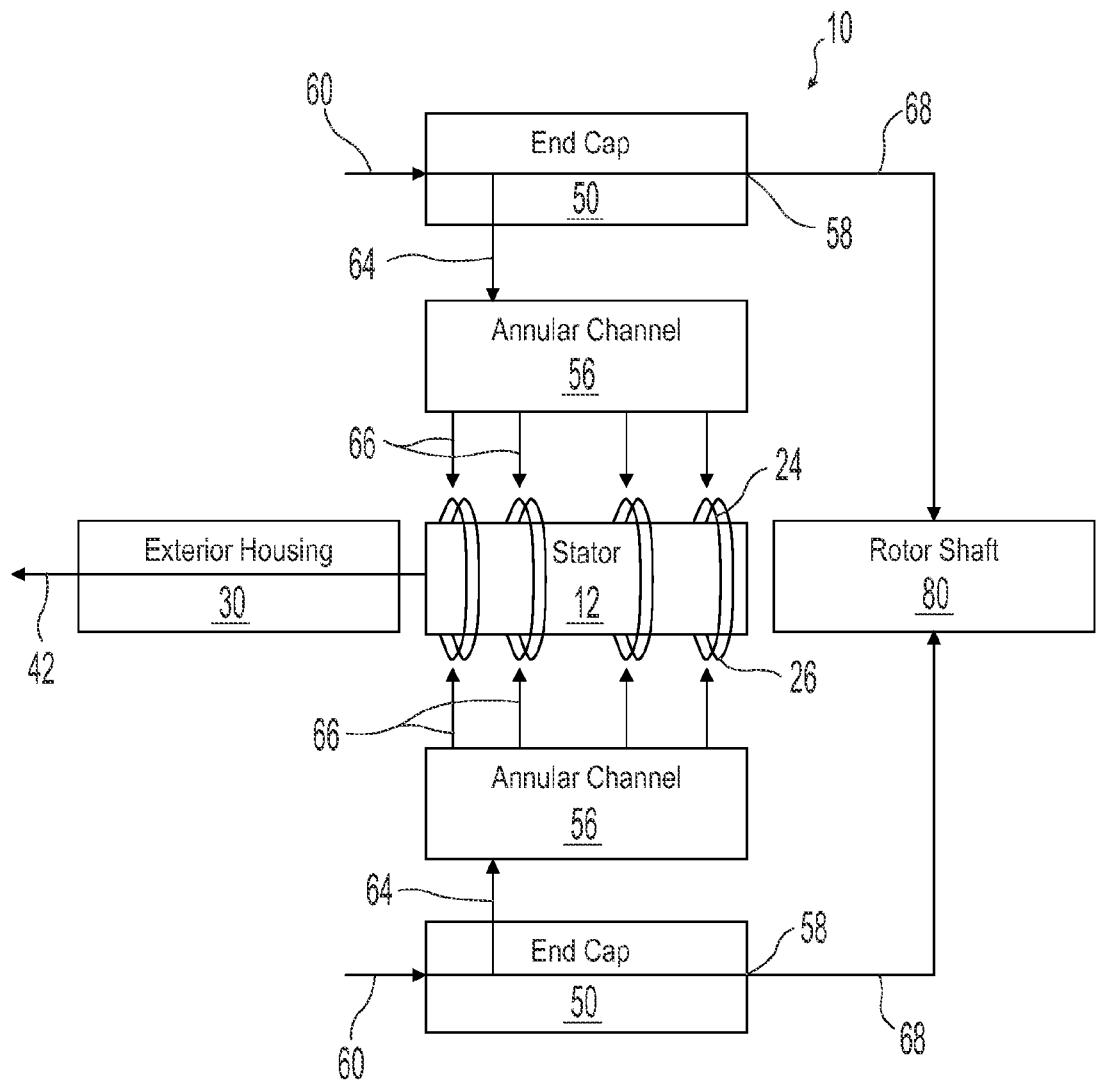
FIG. 8 is a schematic representation of an exemplary method for cooling the electrical machine of FIGS. 1-3.

The above-described cooling method is also illustrated schematically in FIG. 8. First, the oil is directed through entry port 60 of one or both end caps 50. Next, the oil either flows through bearing channel 68 toward central bore 58 of each end cap 50 to lubricate rotor shaft 80, or the oil flows through entry channel 64 into annular channel 56 of motor 10. Then, from annular channel 56, the oil flows through discharge channels 66 and onto end turns 26 of coils 24 of stator 12. After contacting and cooling coils 24 of stator 12, the heated oil exits motor 10 through drain port 42 of exterior housing 30.

The present disclosure may eliminate the need for an external cooling jacket, which may increase the size and weight of motor 10. Also, rather than submerging motor 10 in oil, the present disclosure provides for a continuous flow of oil into and out of motor 10, which may reduce resistance on motor 10 and improve the efficiency of motor 10.

Figure 4A:
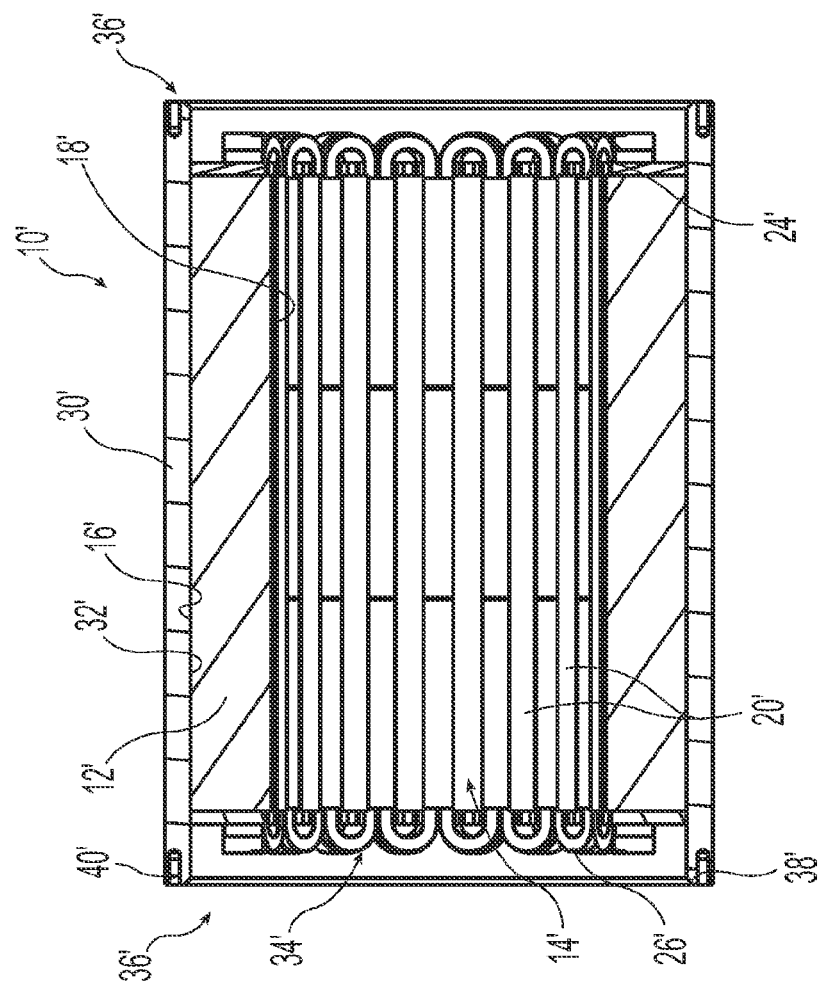
FIG. 4A is a cross-sectional view of the electrical machine of FIG. 4, taken along line A-A of FIG. 4.
Figure 4:
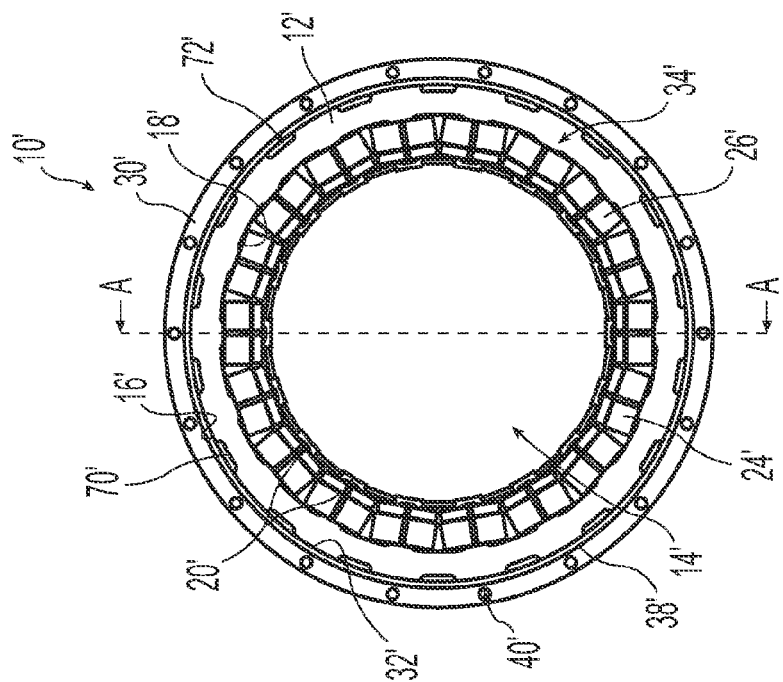
FIG. 4 is a top plan view of another exemplary electrical machine of the present disclosure including an exterior housing and a stator.

FIGS. 4-5 provide another exemplary electrical machine in the form of motor 10'. Except as described below, motor 10' includes many elements that are identical or substantially identical to those of motor 10, and the same reference numerals followed by a prime symbol are used to designate identical or substantially identical elements therebetween.

As shown in FIGS. 4 and 4A, motor 10' includes stator 12' and exterior housing 30'. Outer periphery 16' of stator 12' includes radially spaced notches 70' that cooperate with inner wall 32' of exterior housing 30' to define axial ducts 72'.

Referring next to FIGS. 5, 5A, and 5B, motor 10' further includes first end cap 50' and second end cap 50". In the illustrated embodiment, first end cap 50' and second end cap 50" are coupled to opposite axial ends 36' of exterior housing 30'. With first and second end caps 50', 50", secured to exterior housing 30', motor 10 includes a first annular channel 56' and a second annular channel 56". In the illustrated embodiment of FIGS. 5A and 5B, cylindrical portion 50*b*' of first end cap 50' cooperates with inner wall 32' of exterior housing 30' and stator 12' to define first annular channel 56', and at the opposing axial end 36' of motor 10', cylindrical portion 50*b*" of second end cap 50" cooperates with inner wall 32' of exterior housing 30' and stator 12' to define second annular channel 56". As discussed below, first and second annular channels 56', 56", of first and second end caps 50', 50", cooperate with axial ducts 72' of stator 12'.

An exemplary first, or non-drive, end cap 50' is shown in more detail in FIGS. 6, 6A, and 6B. First end cap 50' includes entry port 60' and drain port 42'. As shown in FIG. 6A, cylindrical portion 50*b*' of first end cap 50' is tapered to direct fluid toward drain port 42'. As shown in FIG. 6B, first end cap 50' also includes entry channel 64' that extends between entry port 60' and first annular channel 56' and a plurality of discharge channels 66' that extend radially inward from first annular channel 56' toward stator 12' (FIG. 5B). First end cap 50' further includes bearing channel 68' that extends between entry port 60' and central bore 58' of first end cap 50', as shown in FIG. 6A.

An exemplary second, or drive, end cap 50" is shown in more detail in FIGS. 7, 7A, and 7B. Second end cap 50" includes drain port 42". As shown in FIG. 7A, cylindrical portion 50*b*" of second end cap 50" is tapered to direct fluid toward drain port 42". As shown in FIG. 7B, second end cap 50" also includes a plurality of discharge channels 66" that extend radially inward from second annular channel 56" toward stator 12' (FIG. 5B). Second end cap 50" further includes bearing channel 68" that extends between second annular channel 56" and central bore 58" of second end cap 50", as shown in FIG. 7A.

Referring back to FIGS. 5, 5A, and 5B, during operation of motor 10', a liquid coolant, such as oil, is delivered to motor 10' for cooling. As shown in FIG. 5A, the oil may be directed through an external hydraulic hose or tube (not shown), for example, and into entry port 60' of first end cap 50'. If first end cap 50' includes bearing channel 68', some of the oil that enters entry port 60' may flow toward central bore 58' of first end cap 50' via bearing channel 68' to lubricate the rotor shaft (not shown). The rest of the oil that enters entry port 60' flows into first annular channel 56' of motor 10' via entry channel 64', such that the oil substantially surrounds stator 12'. From first annular channel 56', the oil either sprays onto end turns 26' of coils 24' of stator 12' via discharge channels 66' of first end cap 50', as shown in FIG. 5B, or the oil flows axially down the outer periphery 16' of stator 12' via axial ducts 72', as shown in FIG. 5A. In this embodiment, the oil cools coils 24' of stator 12', as well as stator 12' itself. After flowing through axial ducts 72', the oil enters second annular channel 56", such that the oil substantially surrounds stator 12'. From second annular channel 56", the oil either sprays onto end turns 26' of coils 24' of stator 12' via discharge channels 66" of second end cap 50", as shown in FIG. 5B, or the oil flows toward central bore 58" of second end cap 50" via bearing channel 68" to lubricate the rotor shaft (not shown), as shown in FIG. 5A. After contacting coils 24' of stator 12', the heated oil may exit motor 10' from either drain port 42' of first end cap 50' or drain port 42" of second end cap 50". The oil that exits motor 10' may be cooled and recycled through motor 10' for additional cooling.

As mentioned above, axial ducts 72' may be provided in communication with first and second annular channels 56', 56", to cool outer periphery 16' of stator 12' in addition to coils 24' of stator 12'. This embodiment may enhance the cooling of motor 10', especially a long motor 10'.

Figure 9:
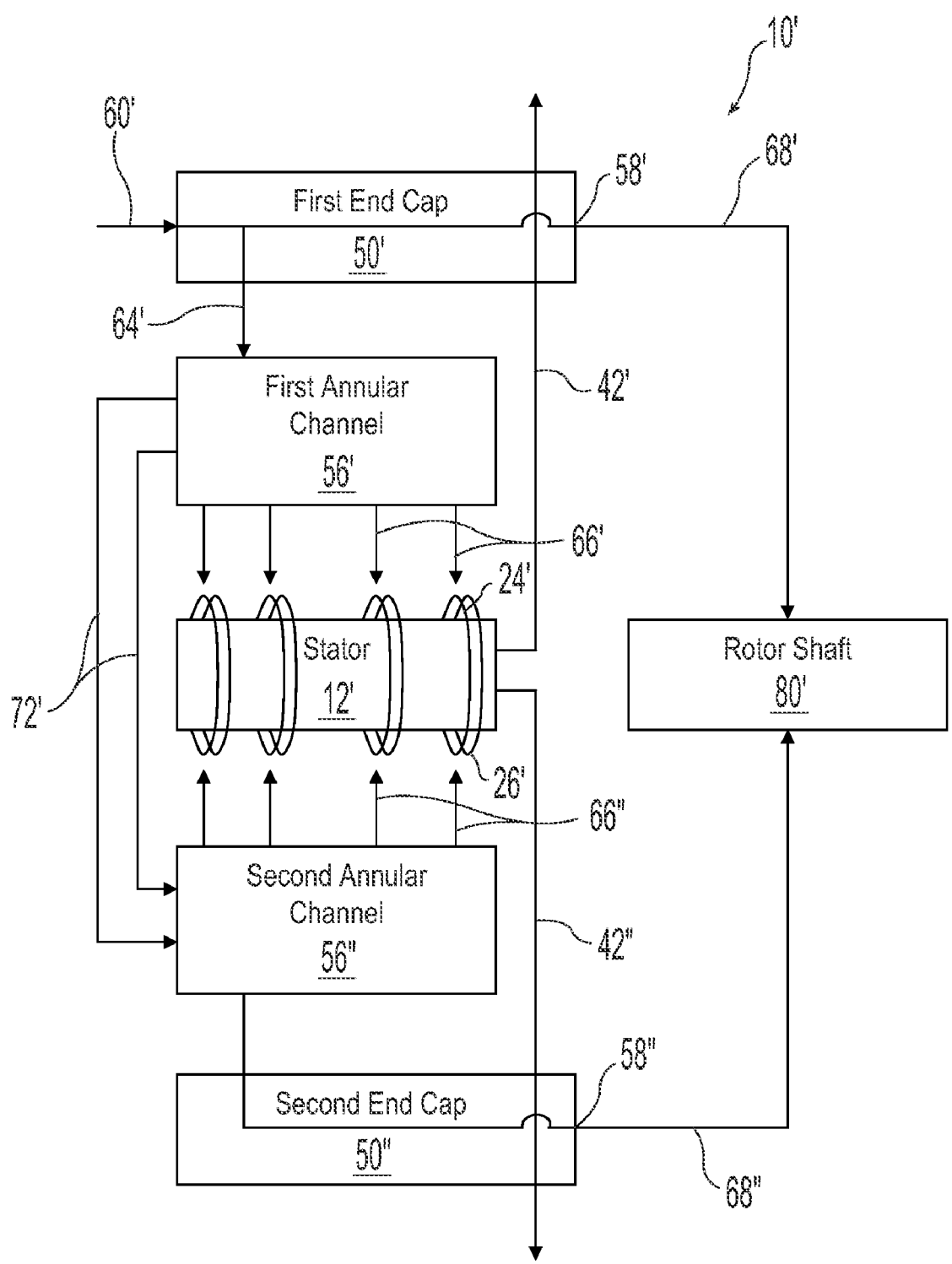
FIG. 9 is a schematic representation of an exemplary method for cooling the electrical machine of FIGS. 4-7.

The above-described cooling method is also illustrated schematically in FIG. 9. First, the oil is directed through entry port 60' of first end cap 50'. Next, the oil either flows through bearing channel 68' toward central bore 58' of first end cap 50' to lubricate rotor shaft 80', or the oil flows through entry channel 64' into first annular channel 56' of motor 10'. From first annular channel 56', the oil either flows through discharge channels 66', onto end turns 26' of coils 24' of stator 12', and out through drain port 42' of first end cap 50', or the oil flows through axial ducts 72' to second annular channel 56". From second annular channel 56", the oil either flows through discharge channels 66", onto end turns 26' of coils 24' of stator 12', and out through drain port 42" of second end cap 50", or the oil flows through bearing channel 68" of second end cap 50" toward central bore 58" of second end cap 50" to lubricate rotor shaft 80'.

While this invention has been described as having preferred designs, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this disclosure pertains and which fall within the limits of the appended claims.

The invention claimed is:

1. An electrical machine including:
    a stator including a plurality of coils, the stator defining an axial bore configured to receive a rotor;
    an exterior housing having a first axial end and a second axial end, the exterior housing defining an axial chamber configured to receive the stator;
    an end cap configured to couple to at least one of the first and second axial ends of the exterior housing;
    a channel including at least a portion defined by the end cap;
    a fluid inlet configured to direct a fluid into the channel; and
    a plurality of fluid outlets spaced radially about the electrical machine and configured to direct the fluid from the portion of the channel to the plurality of coils.

2. The electrical machine of claim 1, wherein the plurality of coils are spaced radially about the stator in radial alignment with the plurality of fluid outlets.

3. The electrical machine of claim 1, wherein the end cap defines a central bore configured to receive a shaft of the rotor, the electrical machine further including a bearing channel configured to direct the fluid from the fluid inlet to the central bore of the end cap to lubricate the end cap and the shaft of the rotor.

4. The electrical machine of claim 1, wherein the exterior housing cooperates with the end cap to define the channel.

5. The electrical machine of claim 1, wherein the channel is an annular channel that substantially radially surrounds the stator.

6. The electrical machine of claim 1, wherein the fluid inlet is defined by the end cap.

7. The electrical machine of claim 1, wherein the plurality of fluid outlets are defined by the end cap.

8. The electrical machine of claim 1, further including:
    a second end cap configured to couple to at least one of the first and second axial ends of the exterior housing; and
    a second channel including at least a second portion defined by the second end cap.

9. An electrical machine including:
    a stator including a plurality of coils, the stator defining an axial bore configured to receive a rotor;
    an exterior housing having a first axial end and a second axial end, the exterior housing defining an axial chamber configured to receive the stator; and
    an end cap configured to couple to at least one of the first and second axial ends of the exterior housing, the end cap including:
        a fluid inlet configured to receive a fluid; and
        a plurality of fluid outlets spaced radially about the electrical machine, at least one of the plurality of fluid outlets configured to deliver the fluid from the fluid inlet to at least one of the plurality of coils.

10. The electrical machine of claim 9, wherein the plurality of coils are spaced radially about the stator in radial alignment with the plurality of fluid outlets.

11. The electrical machine of claim 9, wherein the end cap defines a central bore configured to receive a shaft of the rotor, the electrical machine further including a bearing channel configured to direct the fluid from the fluid inlet to the central bore of the end cap to lubricate the end cap and the shaft of the rotor.

12. The electrical machine of claim 9, wherein the fluid from the fluid inlet travels through more than one of the plurality of fluid outlets for delivery to the plurality of coils.

13. The electrical machine of claim 9, further including an annular channel that substantially radially surrounds the stator, the annular channel at least partially defined by the end cap and communicating with the fluid inlet and the plurality of fluid outlets.

14. The electrical machine of claim 13, wherein the exterior housing cooperates with the end cap to define the annular channel.

15. A method of cooling an electrical machine, the electrical machine including a stator having a plurality of coils, an exterior housing that surrounds the stator and has a first axial end and a second axial end, and an end cap coupled to at least one of the first and second axial ends of the exterior housing, the method including the steps of:
    delivering a liquid coolant to the end cap of the electrical machine; and
    spraying the liquid coolant from radially spaced locations on the end cap onto the plurality of coils of the stator.

16. The method of claim 15, wherein the delivering step includes delivering the liquid coolant to an internal channel that substantially radially surrounds the stator.

17. The method of claim 15, wherein the end cap is coupled to the first axial end of the exterior housing and another end cap is coupled to the second axial end of the exterior housing, and the spraying step includes spraying the liquid coolant from both the end caps onto the plurality of coils of the stator.

18. The method of claim 15, further including the step of continuously draining the liquid coolant from the electrical machine after the spraying step.

* * * * *